United States Patent [19]

Mrowca

[11] 3,906,015
[45] Sept. 16, 1975

[54] CARBOALKOXYLATION AND CARBOALKOXYLATION OF OLEFINS

[75] Inventor: Joseph J. Mrowca, Wilmington, Del.

[73] Assignee: E. I. Du Pont de Nemours & Company, Wilmington, Del.

[22] Filed: Oct. 29, 1973

[21] Appl. No.: 410,395

Related U.S. Application Data

[63] Continuation-in-part of Ser. No. 189,834, Oct. 18, 1971, Pat. No. 3,776,929.

[52] U.S. Cl. ........ 260/410.9 R; 260/410; 260/410.6; 260/408; 260/413; 260/465.4; 260/468 M; 260/473 R; 260/476 R; 260/483; 260/485 R; 260/497 A; 260/521 R; 260/515 A; 260/514 M; 260/533 A
[51] Int. Cl.² .................. C07C 67/38; C07C 51/14
[58] Field of Search..... 260/497 B, 533 AN, 468 M, 260/410.9 R, 413

[56] References Cited
UNITED STATES PATENTS

| | | |
|---|---|---|
| 3,102,899 | 9/1963 | Cannell.............................. 260/439 |
| 3,437,676 | 8/1969 | von Kutepow et al.............. 260/468 |
| 3,700,706 | 10/1972 | Butter.......................... 260/410.9 R |
| 3,733,362 | 5/1973 | Biale............................. 260/604 HF |

*Primary Examiner*—Donald G. Daus
*Assistant Examiner*—Diana G. Rivers

[57] ABSTRACT

Unconjugated olefins having at least two hydrogens substituted at the olefinic carbon atoms, free of amine groups and free of hydroxyl or halogen substituents at carbon atoms $\alpha$ and $\beta$ to the unsaturation can be carboxylated or carboalkoxylated by reaction with carbon monoxide and water or an alcohol in the presence of a catalyst $L_2MXY$ where M is Pd or Pt, X and Y alike or different are chlorine, bromine, iodine, alkyl, cyano, $-SnCl_3$, alkanoyl or aroyl, and when X and Y are different X can also be H, and L is a phosphinite, phosphonite, thiophosphinite or dithiophosphonite ligand.

6 Claims, No Drawings

CARBOALKOXYLATION AND CARBOALKOXYLATION OF OLEFINS

RELATED APPLICATION

This application is a continuation-in-part of application Ser. No. 189,834 filed Oct. 18, 1971, now U.S. Pat. No. 3,776,929.

FIELD OF THE INVENTION

This invention relates to a method of making acids and esters by the reaction of an unsaturated compound with carbon monoxide and water or an alcohol.

THE PRIOR ART

The addition of carbon monoxide and water or an alcohol to olefin to give acids or esters is a known reaction. Kutepow, Bitler and Neubauer U.S. Pat. No. 3,437,676 teach a process for the carbonylation of olefins using palladium salts complexed with phosphines, phosphites, ammonia, amines, nitriles and unsaturated hydrocarbons.

Butter, U.S. Pat. No. 3,700,706 teaches the use of palladium catalysts containing phosphine ligands with a cocatalyst of a tin compound to carboxylate and carboalkoxylate olefins.

SUMMARY OF THE INVENTION

The present invention is directed to a process for the carboxylation or carboalkoxylation of olefins by contacting and reacting an olefin with water or an alcohol and carbon monoxide in the presence of a catalyst, where said olefin preferably has up to 30 carbon atoms and has at least one nonconjugated olefinic group with at least two hydrogen atoms on the carbon atoms of said group, said olefin being free of amine substituents and hydroxy or halide substituents less than 2 carbon atoms from said unsaturated group; the alcohol is a primary or secondary aliphatic or an alicyclic alcohol preferably of up to 10 carbon atoms.

The process is characterized by the use of compounds $$L_2MXY$$

as the catalyst wherein M is Pd or Pt, X and Y alike or different are chlorine, bromine, iodine, alkyl of up to 5 carbon atoms, cyano, $SnCl_3$, alkanoyl of 2–5 carbon atoms or aroyl of up to 12 carbon atoms with the proviso that one of X and Y can be H, and L is selected from

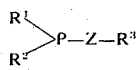 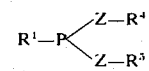

where $R^1$, $R^2$, $R^3$, $R^4$, and $R^5$ are selected from linear or branched alkyl of up to 10 carbon atoms; aryl of up to 12 carbon atoms; aryl of up to 12 carbon atoms substituted with up to 5 lower alkyl or lower alkoxy groups, each containing up to 4 carbon atoms, up to 5 halogen atoms, up to 3 cyano groups, up to 3 lower alkoxy carbonyl groups, or up to 3 trifluoromethyl groups; aralkyl of up to 12 carbon atoms and $R^4$ and $R^5$ taken together can be o-arylene of up to 12 carbon atoms or

where $n$ is 2 or 3; and Z is O or S.

DETAILED DESCRIPTION OF THE INVENTION

The process of the present invention can be represented by:

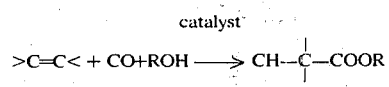

when R is H, primary or secondary alkyl or cycloalkyl; the novelty residing in the use of new catalytic noble metal compounds disclosed by the applicant and claimed in Ser. No. 189,834, filed Oct. 18, 1971 of which this case is a continuation-in-part.

The catalyst has the formula $$L_2MXY$$

wherein M is platinum or palladium.

Preferred phosphorus-containing ligands (L) which have the structure,

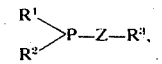

(wherein $R^1$, $R^2$, $R^3$ and Z are as heretofore defined) include:
1. $(C_6H_5)_2$-P-$OC_6H_5$
2. $(C_6H_5)_2$-P-$OCH_3$
3. $(C_6H_5)_2$-P-$OC_2H_5$
4. $(C_6H_5)_2$-P-O-$C_4H_9$ (normal)
5. $(C_6H_5)_2$-P-S-$C_6H_5$ Preferred ligands (L) of the structure,

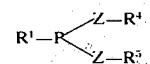

(wherein $R^1$, $R^4$, $R^5$ and Z are as heretofore defined) include:

6. $C_6H_5$-P-$(OC_6H_5)_2$
7. $C_6H_5$-P-$(OCH_3)_2$
8. $C_6H_5$-P-$(OC_2H_5)_2$
9. $C_6H_5$-P$(OC_4H_9)_2$ (normal)
10. $CH_3$-P-$(OC_6H_5)_2$ 11. 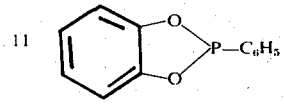

Other suitable ligands (L) according to Formula II include:

12. $(CH_3)_2$-P-O-$C_6H_5$
13. $(C_2H_5)_2$-P-O-$C_6H_5$
14. $(CH_3)_2$-P-O-$CH_3$
15. $(CH_3)_2$-P-O-$C_2H_5$
16. $(CH_3)_2$-P-O-$C_4H_9$ (normal)
17. $(C_2H_5)_2$-P-O-$CH_3$
18. $(C_2H_5)_2$-P-O-$C_2H_5$
19. $(C_2H_5)_2$-P-O-$C_4H_9$ (normal)
20. $(C_6H_5)_2$-P-O-$C_3H_7$ (iso)
21. $(C_6H_5)_2$-P-O-$CH_2C_6H_5$
22. $(C_6H_5)_2$-P-O-$CH_2CF_3$
23. $(C_6H_5)_2$-P-O-$CH_2CH_2OCH_3$ 24. 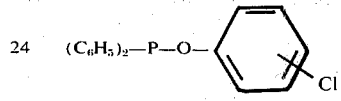

-Continued

25 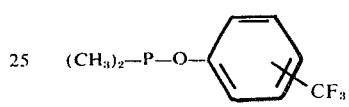

26 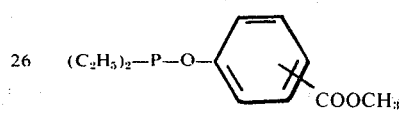

27. $(C_6H_5)_2\text{-P-S-CH}_3$
28. $(C_6H_5)_2\text{-P-S-C}_2H_5$

Other suitable ligands (L) according to Formula III include:

29. $C_2H_5\text{-P-}(OC_6H_5)_2$
30. $CH_3\text{-P-}(OCH_3)_2$
31. $CH_3\text{-P-}(OC_2H_5)_2$
32. $CH_3\text{-P-}(OC_4H_9)_2$ (normal)
33. $C_2H_5\text{-P-}(OCH_3)_2$
34. $C_2H_5\text{-P-}(OC_2H_5)_2$
35. $C_2H_5\text{-P-}(OC_4H_9)_2$ (normal)
36. $C_6H_5\text{-P-}(OC_3H_7)_2$ (iso)
37. $C_6H_5\text{-P-}(OCH_2C_6H_5)_2$
38. $C_6H_5\text{-P-}(OCH_2CF_3)_2$
39. $C_6H_5\text{-P-}(OCH_2CH_2OCH_3)_2$ 40 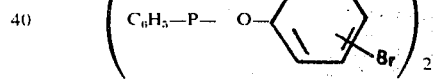

41 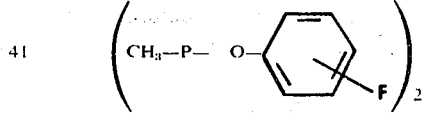

42 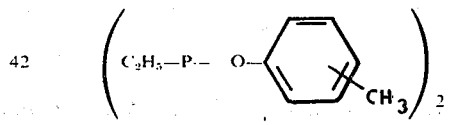

43, 44 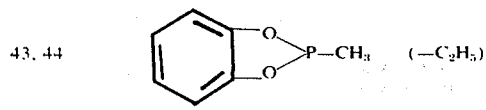

45, 46, 47 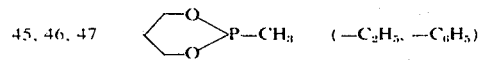 $(\text{—}C_2H_5, \text{—}C_6H_5)$

48. $C_6H_5\text{-P-}(S\text{-}C_6H_5)_2$
49. $C_6H_5\text{-P-}(S\text{-}CH_3)_2$
50. $C_6H_5\text{-P-}(S\text{-}C_2H_5)_2$ 51 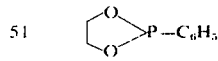

Following are some representative values for X and Y. It is noted that only one of X or Y can be hydrogen and when one of X or Y is hydrogen, then the other of X or Y can be any one of the groups set out hereafter. It is preferred that X and Y be chlorine, or bromine. It is also preferred that when only one of X or Y is chlorine or bromine, the other of X or Y is hydrogen. It is most preferred that X and Y both be chlorine. X and Y, which can be the same or different, can also be selected from:

iodine;
alkyl of up to 5 carbon atoms, e.g., methyl, ethyl, isopropyl, t-butyl, aryl of up to 12 carbon atoms, e.g., phenyl α- and β- napthyl and the biphenylyls; cyano, $SnCl_3$, alkanoyl of 2–5 carbon atoms, e.g., acetyl, isopropionyl, pentanoyl, aroyl of up to 12 carbon atoms, e.g., benzoyl, o-, m-, and p-toluoyl, p-ethylbenzoyl, p-amylbenzoyl;

when X is not equal to Y, one of X and Y can be hydrogen.

The compounds can be made by reacting a source of MXY when M, X and Y are as defined heretofore with 2 or more equivalents of a phosphonite, dithiophosphonite, phosphinite or thiophosphinite ligand. The source of MXY can be (1) MXY itself (2) $Z_2^1$ MXY or (3) $Z^2$MXY when $Z^1$ is a monodentate labile ligand such as benzonitrile, dimethyl phenyl phosphine, acetonitrile, etc., and $Z^2$ is a bidentate labile ligand such as norbornadiene.

The process proceeds as follows depending on the source of MXY:

$2(L) + MXY \rightarrow (L)_2MXY$ $2(L) + Z_2^1MXY \rightarrow (L)_2MXY + 2Z^1$ $2(L) + Z^2MXY \rightarrow (L)_2MXY + Z^2$ All reactions will proceed at ambient temperature or higher in a solvent which can be selected from chloroform, methylene chloride, benzene, benzonitrile, acetonitrile, and other lower alkyl cyanides. Reactions of ligands with platinous and palladous halides are slow and may require extended periods of time for completion. For instance, periods of up to 24 hours or more may be necessary. In the case of a ligand of low reactivity, warming can be employed to increase the rate of the reaction. The reactions in which labile ligands are displaced are generally complete in about 10 minutes to 1 hour but may require up to 24 hours.

The preferred platinum and palladium starting reactants are platinous and palladous salts, especially dichloro salts. As an alternative to making the novel compounds by the novel process of this invention, it is also possible to make some of them using known chemical reactions but employing other of the novel compounds as starting reactants. For instance, the following procedures are possible.

(a) $L_2MCl_2 + 2I^- \rightarrow L_2MI_2 + 2Cl^-$
(b) $L_2MCl_2 + 2Br^- \rightarrow L_2MBr_2 + 2Cl^-$
(c) $L_2MCl_2 + CH_3MgCl \rightarrow L_2MClCH_3 + MgCl_2$
(d) $L_2M(CH_3)_2 + 2HCN \rightarrow L_2M(CN)_2 + 2CH_4$
(e) $L_2MCl_2 + 2KCN \rightarrow L_2M(CN)_2 + 2KCl$
(f) $L_2MClY + SnCl_2 \rightarrow L_2MSnCl_3Y$
(g) $L_2MY(\text{alkyl or aryl})$ $$+ CO \rightarrow L_2MY(\overset{O}{\overset{\|}{C}}\text{—alkyl or aryl})$$

References concerning the chemistry of some of the reactions (a) to (g) above are as follows:

(a) and (b) J. M. Jenkins et al., J. Chem. Soc. (A) London, 1966, 770.

c. G. Calvin et al., J. Chem. Soc., London, 1960, 2008; J. Chatt et al., J. Chem. Soc., London, 1957, 705.

e. J. C. Bailar, Jr. and H. Itatani, J. Am. Chem. Soc., 89, 1592 (1967);

f. M. Sakakibara et al., Inorg. Nucl. Chem. Letters, 5, 427 (1969);

g. G. Booth et al., J. Chem. Soc. (A) 1966, 634.

Complexes of the type $L_2MHCl$ can be prepared as described in J. C. Bailar, Jr. and H. Itatani, Inorg. Chem., 4, 1618 (1965), J. Chatt & B. L. Shaw, J. Chem. Soc. 1962, 5075, H. Munakata & M. L. H. Green, Chem. Comm., 1970, 881, and E. H. Brooks and F. Glockling, J. Chem. Soc. 1967, (A), 1030.

The reaction is applicable to olefins provided (1) at least two hydrogen atoms are attached to the unsaturated carbon atoms (2) that the olefinic unsaturation is unconjugated (3) that the olefin is free of amine groups and (4) that hydroxy and halo substituents are removed from the double bond by about at least 2 carbon atoms. Preferably the olefins have no more than 30 carbon atoms. Examples include ethylene, isobutene, 2-butene, 2-ethylhexene, oxtadecene, 1,9-terdecadiene, methyl 10-undecenoate, 5-hexene-2-one, 5-hexenenitrile, 1-bromododecene-6,cyclopentene, cyclohexene, vinylcyclohexane, styrene, indene, m-trifluoromethylstyrene, p-methoxystyrene, p-bromostyrene, p-acetoxystyrene, cyclooctadecene.

The alcohols can contain more than one hydroxy group attached to an aliphatic or alicyclic system. Examples include, methanol, ethanol, isopropanol, β-chloroethanol, glycol, diglycol, pentaerythritol, cyclohexanol, cyclopentanol and 1,4-dihydroxycyclohexane.

The reaction can be carried out in any convenient vessel which is not attacked by the reactants or products and which will withstand the pressure and temperature. Hastelloy, glass-lined steel, stainless steel, glass or glazed ceramic vessels can be used.

The pressure is generally 1–1000 atmospheres and preferably about 100 to 700 atmospheres. Temperature is generally between 35° and 200°C. and preferably at 60° to 120°C. Five to 10 hours is generally a sufficient time for the reaction.

EMBODIMENTS OF THE INVENTION

The following examples are intended to illustrate this invention but should not be construed as fully delineating the scope thereof.

EXAMPLE 1

A. Preparation of dichlorobis(dimethyl phenylphosphonite platinum(II).

A solution of 1.95 g of dimethyl phenylphosphonite in 20 ml of dichloromethane was added to a suspension of 2.0 g of dichloro(norbornadiene)platinum(II) in 20 ml of dichloromethane. The mixture was stirred for 1 hour and evaporated under vacuum to give 3.33 g (99% yield) of dichlorobis(dimethyl phenylphosphonite)platinum(II) as white crystals, m.p. 180°–183°C.

Anal. Calcd. for $C_{16}H_{22}Cl_2O_4P_2Pt$: C, 31.69; H, 3.66 Found: C, 32.18; H, 3.67.

B. Carbomethoxylation of Ethylene with $[C_6H_5P(OCH_3)_2]_2\text{-PtCl}_2$ Catalyst A mixture of 0.12 g of dichlorobis(dimethyl phenylphosphonite)platinum(II), 10 ml of methanol, and 2 g of ethylene was heated slowly to 200° under 1000 atm of carbon monoxide. A gas-liquid partition chromatographic (glpc) analysis of the resulting mixture showed the formation of methyl propionate as the main product.

EXAMPLE 2

A. Preparation of dichlorobis(phenyl diphenylphosphinite) palladium (II).

A 6.0 g portion of phenyl diphenylphosphinite was added to a filtered solution of 3.0 g of dichlorobis(benzonitrile)palladium(II) in 225 ml of benzene. The mixture was stirred for 1 hour, and the precipitate was filtered, washed with benzene and hexane, and dried to give 5.6 g of solid. Recrystallization from 150 ml of chlorobenzene gave 4.71 g of dichlorobis(phenyl diphenylphosphinite)palladium(II) as pale-yellow crystals, dec. 195°C, with m.p. 218°–222°C.

Anal. Calcd. for $C_{36}H_{30}Cl_2O_2P_2Pd$: C, 58.92; H, 4.12 Found: C, 58.96; H, 4.14.

B. Carbomethoxylation of ethylene with $[(C_6H_5)_2POC_6H_5]_2PdCl_2$ as catalyst.

Example I, part B was repeated except that $[(C_6H_5)_2P\text{-}OC_6H_5]_2$ $PdCl_2$ was used as the catalyst. Methyl propionate was the main product.

EXAMPLE 3

A. Preparation of dichlorobis(methyl diphenylphosphinite)palladium(II).

A 9.3 g portion of methyl diphenylphosphinite was added dropwise to a filtered solution of 6.0 g of dichlorobis(benzonitrile)palladium(II) in 650 ml of benzene. The mixture was stirred for 1 hour, and the creamy-white solid was filtered and washed with benzene and ether. Recrystallization of the solid from 300 ml of chlorobenzene gave 6.0 of dichlorobis(methyl diphenylphosphinite) palladium(II) as pale-yellow crystals, dec. 185°C, with m.p. 198°–21 °C.

Anal. Calcd. for $C_{26}H_{26}Cl_2O_2P_2Pd$: C, 51.21; H, 4.30; P, 10.17; Cl, 11.63 Found: C, 50.60; H, 4.23; P, 10.29; Cl, 12.37.

B. Alternative method of preparation of dichlorobis(methyl diphenylphosphinite)palladium(II).

A mixture of 10 g of palladium chloride, 300 ml of acetonitrile, and 25 g of methyl diphenylphosphinite was stirred for 18 hours under nitrogen. The resulting creamy-white solid was filtered, washed with acetonitrile and ether, and recrystallized from 800 ml of chlorobenzene to give 20.2 g of dichlorobis(methyl diphenylphosphinite)palladium(II) as pale-yellow crystals identical to those obtained in Example 3A.

Anal. Calcd. for $C_{26}H_{26}Cl_2O_2P_2Pd$: C, 51.21; H, 4.30 Found: C, 51.49; H, 4.36.

C. Carbomethoxylation of 1-hexene with dichlorobis(methyl diphenylphosphinite)palladium(II) catalyst.

A mixture of 20 g of 1-hexene, 20 g of methanol, and 0.61 g of dichlorobis(methyl diphenylphosphinite)palladium(II) was heated in a shaker tube at 90° and 700 atm of carbon monoxide for 10 hr. A glpc analysis of the resulting mixture showed a 30% conversion of 1-hexene to a mixture of esters containing 62% of the linear ester, methyl n-heptanoate and 38% of the branched ester methyl α-methyl-n-hexanoate. Distillation gave 8.1 g of esters.

D. Carboxylation of 1-hexene in presence of dichlorobis (methyl diphenylphosphinite)palladium(II)

A mixture of 0.61 g of dichlorobis(methyl diphenylphosphinite)palladium(II), 15 g of 1-hexene, 20 ml of acetone, and 4 g of water was heated at 90° and 1500 psi carbon monoxide pressure for 10 hours. Volatile material was removed under water aspirator vacuum and the residue distilled to yield 4.5 g of mixed 7-carbon acids, boiling at 32°/0.05 mm. The acids were identified as heptanoic acid and 2-methyl hexanoic acid by infrared and proton nmr spectra.

EXAMPLE 4

A. Preparation of dichlorobis(ethyl diphenylphosphinite)palladium(II).

A 3.4 g portion of ethyl diphenylphosphinite was added to a filtered solution of 2.0 g of dichlorobis(benzonitrile)palladium(II) in 150 ml of benzene. The mixture was stirred for 1 hour, and the white solid was filtered and recrystallized from benzene/dichloromethane to give 2.45 g of dichlorobis(ethyl diphenylphosphinite)palladium(II) as white crystals, dec. 185°C.

Anal. Calcd. for $C_{28}H_{30}Cl_2O_2P_2Pd$: C, 52.73; H, 4.74
Found: C, 52.75; H, 4.79.

B. Carboethoxylation of cyclooctene with dichlorobis(ethyl diphenylphosphinite)palladium(II) catalyst.

A mixture of 20 g of cyclooctene, 20 ml of ethanol, and 0.7 g of dichlorobis(ethyl diphenylphosphinite)palladium(II) was heated in a shaker tube at 90° and 700 atm of carbon monoxide for 10 hr. A glpc analysis of the resulting mixture showed a 97% conversion of cyclooctene to ethyl cyclooctanecarboxylate as the only product.

Since many modifications and variations will be apparent to those skilled in the art I propose to be bound solely by the appended claims.

I claim:

1. A process for the carboxylation or carboalkoxylation of an olefin which comprises the step of contacting and reacting said olefin with carbon monoxide and water or a primary or secondary saturated aliphatic or alicyclic alcohol of up to 10 carbon atoms in the presence of a catalyst wherein said olefin is an organic compound of up to 30 carbon atoms containing at least one unconjugated ethylenic group having at least two hydrogens attached to the unsaturated carbon atoms, free of amine groups and free of hydroxy or halide substituents closer than two carbon atoms from the ethylenic group;

said catalyst having the formula $$L_2MXY$$

wherein M is Pt or Pd

X and Y, alike or different are chlorine, bromine, iodine, alkyl of up to five carbon atoms, cyano, alkanoyl of 2-5 carbon atoms, aroyl of up to 12 carbon atoms and when X does not equal Y, one of X and Y can be hydrogen; and L is

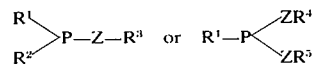

in which X is O or S;

$R^1$, $R^2$, $R^3$, $R^4$ and $R^5$ are selected from linear or branched alkyl of up to 10 carbon atoms; aryl of up to 12 carbon atoms; aryl of up to 12 carbon atoms substituted with up to 5 lower alkyl groups or lower alkoxy groups, each containing up to 4 carbon atoms, up to 5 halogen atoms, up to 3 cyano groups, up to 3 lower alkoxycarbonyl groups or up to 3 trifluoromethyl groups; aralkyl of up to 12 carbon atoms and $R^1$ and $R^5$ taken jointly can be o-arylene of up to 12 carbon atoms or $-(CH_2)_n-$ wherein $n$ is 2 or 3.

2. Process of claim 1 wherein said reaction is conducted at 60°–120°C.

3. Process of claim 2 wherein said catalyst is dichlorobis(methyl diphenylphosphinite) palladium (II)

4. Process of claim 2 wherein said catalyst is dichlorobis(dimethyl phenylphosphonite)platinum(II).

5. Process of claim 2 wherein said catalyst is dichlorobis(phenyl diphenylphosphinite) palladium (II).

6. Process of claim 2 wherein said catalyst is dichlorobis(ethyl diphenylphosphinite)palladium(II).

* * * * *